(12) United States Patent
Karlsson et al.

(10) Patent No.: US 9,712,584 B2
(45) Date of Patent: Jul. 18, 2017

(54) CONTEXT-BASED ADAPTIVE STREAMING ALGORITHM FOR A USER DEVICE

(71) Applicant: Sony Mobile Communications Inc., Tokyo (JP)

(72) Inventors: Peter C. Karlsson, Lund (SE); Martin Danielsson, Lund (SE); Anders Isberg, Akarp (SE); Rickard Ljung, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 484 days.

(21) Appl. No.: 14/293,466

(22) Filed: Jun. 2, 2014

(65) Prior Publication Data
US 2015/0350276 A1 Dec. 3, 2015

(51) Int. Cl.
*H04L 29/06* (2006.01)
*H04N 21/414* (2011.01)
*H04N 21/44* (2011.01)
*H04N 21/442* (2011.01)
*H04N 21/45* (2011.01)
*H04N 21/6373* (2011.01)
*H04N 21/2343* (2011.01)

(52) U.S. Cl.
CPC ....... *H04L 65/60* (2013.01); *H04N 21/41407* (2013.01); *H04N 21/44004* (2013.01); *H04N 21/44209* (2013.01); *H04N 21/4524* (2013.01); *H04N 21/6373* (2013.01); *H04N 21/23439* (2013.01)

(58) Field of Classification Search
None
See application file for complete search history.

(56) References Cited

U.S. PATENT DOCUMENTS

| | | | |
|---|---|---|---|
| 2014/0258552 A1* | 9/2014 | Oyman | H04N 19/146 709/231 |
| 2015/0023404 A1* | 1/2015 | Li | H04L 65/4084 375/240.02 |
| 2015/0113159 A1* | 4/2015 | Gogoi | H04N 21/234327 709/231 |

(Continued)

OTHER PUBLICATIONS

Thorsten Lohmar et al: "Dynamic adaptive HTTP streaming of live content," IEEE International Symposium on World of Wireless, Mobile and Multimedia Networks (WOWMOM), 2011, IEEE, Jun. 20, 2011 (Jun. 20, 2011), XP032047733, 7 pages.

(Continued)

*Primary Examiner* — Natisha Cox
(74) *Attorney, Agent, or Firm* — Tucker Ellis LLP (57) ABSTRACT

A method, a device, and a non-transitory storage medium having instructions to receive a request to begin an adaptive streaming session; receive, in response to receiving the request, context information, wherein the context information pertains to a link state between the device and another device that provides a streaming media; calculate, based on the context information, values for dynamic parameters pertaining to the adaptive streaming session, wherein the dynamic parameters pertain to buffer management and codec selection; and provide, based on the values for the dynamic parameters, the streaming media to a user.

19 Claims, 7 Drawing Sheets

(56) References Cited

U.S. PATENT DOCUMENTS

| | | | | |
|---|---|---|---|---|
| 2015/0146697 A1* | 5/2015 | Gibbon | ................ | H04W 52/30 |
| | | | | 370/336 |
| 2015/0334153 A1* | 11/2015 | Koster | ................ | H04L 65/4069 |
| | | | | 709/219 |
| 2015/0341634 A1* | 11/2015 | Jiang | ................ | H04N 19/30 |
| | | | | 375/240.02 |
| 2016/0277474 A1* | 9/2016 | Ljung | ................ | H04L 65/80 |

OTHER PUBLICATIONS

Doug Young Suh et al: "Dash Sand CE: On Cross-Layer Interface," 106. MPEG Meeting; Oct. 28-Nov. 1, 2013;.Geneva; (Motion Picture Expert Group or OR ISO/IEC JTC1/SC29/WG11), No. M31084, Oct. 17, 2013 (Oct. 17, 2013), XP030059537, 3 pages.
International Search Report and Written Opinion dated May 18, 2015 for related International Application No. PCT/IB2014/066004.

* cited by examiner

CONTEXT-BASED ADAPTIVE STREAMING ALGORITHM FOR A USER DEVICE

BACKGROUND

Mobile devices, such as a smartphone or a tablet device, offer various services to their users. Given the popularity of streaming media, such as movies or other multimedia content, users can enjoy watching streaming media at various locations and virtually anytime. Currently, adaptive bit-rate streaming is a prominent technology used in the delivery of streaming media.

SUMMARY

According to one aspect, a method may comprise receiving, by a user device, a request to begin an adaptive streaming session; receiving, by the user device, in response to receiving the request, context information, wherein the context information pertains to a link state between the user device and a device to provide a streaming media; calculating, by the user device, based on the context information, values for dynamic parameters pertaining to the adaptive streaming session, wherein the dynamic parameters pertain to buffer management and codec selection; and providing, by the user device, the streaming media to a user of the user device based on the values for the dynamic parameters.

Additionally, the context information may include at least one of received signal strength by the user device, a protocol used by the user device, a wireless standard used by the user device, or a signal-to-noise ratio.

Additionally, the context information may include at least one of position information pertaining to the user device, traffic information pertaining to traffic statistics of the adaptive streaming session, or motion information pertaining to the user device.

Additionally, the method may further comprise receiving, in response to receiving the request, prediction information, wherein the prediction information pertains to a predicted location towards which the user is traveling and network conditions associated with the predicted location; and calculating, in response to receiving the prediction information, the values for the dynamic parameters based on the prediction information.

Additionally, the method may further comprise determining whether a triggering event occurs, based on the context information; and determining, in response to a determination that the triggering event occurs, whether the values for the dynamic parameters are to be changed.

Additionally, the method may further comprise applying values of the context information to a weighted model, and wherein the calculating may comprise using the weighted model to calculate the values for the dynamic parameters, wherein one of the values indicates a buffer level and another one of the values indicates a bit-rate for segments of the streaming media to download.

According to another aspect, a user device may comprise a communication interface, a memory, wherein the memory stores software, and a processor, wherein the processor executes the software to receive a request to begin an adaptive streaming session; receive, in response to receiving the request, context information, wherein the context information pertains to a link state between the user device and a device to provide a streaming media; calculate, based on the context information, values for dynamic parameters pertaining to the adaptive streaming session, wherein the dynamic parameters pertain to buffer management and codec selection; and provide, via the communication interface, the streaming media to a user of the user device based on the values for the dynamic parameters.

Additionally, the context information may include at least one of received signal strength by the user device, a protocol used by the user device, a wireless standard used by the user device, or a signal-to-noise ratio.

Additionally, the context information may include at least one of position information pertaining to the user device, traffic information pertaining to traffic statistics of the adaptive streaming session, or motion information pertaining to the user device.

Additionally, the user device may be configured to receive, in response to receiving the request, prediction information, wherein the prediction information pertains to a predicted location towards which the user is traveling and network conditions associated with the predicted location; and calculate, in response to receiving the prediction information, the values for the dynamic parameters based on the prediction information.

Additionally, the software may include a media player, and the media player includes an adaptive streaming algorithm that calculates the values for the dynamic parameters.

Additionally, each of the values may include an upper bound value and a lower bound value, and wherein one of the values may indicate a time to refill a buffer.

Additionally, the user device may be configured to apply values of the context information to a weighted model, and wherein, when calculating, the user device may be further configured to use the weighted model to calculate the values for the dynamic parameters, wherein one of the values indicates a buffer level and another one of the values indicates a bit-rate for segments of the streaming media to download.

Additionally, the user device may further comprise a display, and wherein the streaming media may be a movie.

According to yet another aspect, a non-transitory storage medium may store instructions executable by a processor of a computational device, which when executed, cause the computational device to receive a request to begin an adaptive streaming session; receive, in response to receiving the request, context information, wherein the context information pertains to a link state between the computational device and a device to provide a streaming media; calculate, based on the context information, values for dynamic parameters pertaining to the adaptive streaming session, wherein the dynamic parameters pertain to buffer management and codec selection; and provide, based on the values for the dynamic parameters, the streaming media to a user of the computational device.

Additionally, the context information may include at least one of received signal strength by the computational device, a protocol used by the computational device, a wireless standard used by the computational device, or a signal-to-noise ratio.

Additionally, the context information may include at least one of position information pertaining to the computational device, traffic information pertaining to traffic statistics of the adaptive streaming session, or motion information pertaining to the computational device.

Additionally, the instructions may comprise instructions to store historical information pertaining to previous adaptive streaming sessions; use the historical information as a basis to generate prediction information that pertains to the adaptive streaming session; and wherein the instructions to calculate may comprise instructions to calculate, based on the context information and the prediction information, the values for the dynamic parameters pertaining to the adaptive streaming session.

Additionally, the instructions may comprise instructions to apply values of the context information to a weighted model, and wherein the instructions for calculating may comprise instructions to use the weighted model to calculate the values for the dynamic parameters, wherein one of the values indicates a buffer level and another one of the values indicates a bit-rate for segments of the streaming media to download.

DETAILED DESCRIPTION OF PREFERRED EMBODIMENTS

The following detailed description refers to the accompanying drawings. The same reference numbers in different drawings may identify the same or similar elements.

A user device, such as a mobile device, may provide an adaptive streaming service when receiving streaming media and providing this media to a user. In one approach, the adaptive streaming service uses a streaming algorithm to select, among differently encoded segments (e.g., bit-rates), appropriate segments. Additionally, the streaming algorithm performs buffer management, which includes determining when to request the download of additional segments (e.g., from a streaming server). When adaptive streaming occurs via a mobile network, the encoding and buffering parameters may be dynamic since the link state between the user device and the mobile network may change over time.

According to an exemplary embodiment, a user device provides an adaptive streaming service based on context information. According to an exemplary embodiment, the context information includes information pertaining to the connection used by the user device to receive the streaming media. For example, the connection information may indicate the type of wireless standard used (e.g., Wi-Fi (e.g., 802.11x (e.g., x=a, b, g, ac, n, etc.)), cellular, WiMax, etc.), the type of wireless network used (e.g., a Long Term Evolution (LTE) network, a Global System for Mobile Communications (GSM) network, a Universal Mobile Telecommunication System (UTMS) network, a High-Speed Packet Access (HSPA) network, an evolved High Rate Packet Data (eHRPD) network, an Evolution Data Optimized (EV-DO) network, a Wideband Code Division Multiple Access (WCDMA) network, etc.), the protocol used (e.g., Hypertext Transfer Protocol (HTTP), Dynamic Adaptive Streaming over HTTP (DASH), HTTP Live Streaming (HLS), Smooth Streaming, HTTP Dynamic Streaming (HDS), SPDY, Quick UDP Internet Connection (QUIC), etc.), received signal strength (e.g., received signal power), and/or received signal quality (e.g., a signal-to-noise-plus-interference ratio (SNIR), a signal-to-noise ratio (SNR), etc.).

According to an exemplary embodiment, the context information includes information pertaining to the position of the user and/or user device. For example, the position information may indicate a longitude and latitude, a name of a place (e.g., home, work, a state, city, street, and zip code, a business address, etc.), a cell identifier, and/or other forms of information that indicates a position or a location. The position information may also indicate altitude. According to an exemplary embodiment, the context information includes information pertaining to mobility. For example, the motion information may indicate direction, speed, velocity, acceleration, etc., pertaining to the user and/or user device.

According to an exemplary embodiment, the context information includes information pertaining to traffic characteristics. For example, the traffic information may indicate traffic statistics pertaining to the streaming media, such as, packet loss ratio, data rate, data response delay, and/or another type of traffic and/or quality-of-service (QoS) metric.

According to an exemplary embodiment, the context information includes historical information. For example, the historical information pertains to previous streaming sessions. In this regard, for example, the historical information may include connection information, position information, motion information, and/or traffic information.

According to an exemplary embodiment, the adaptive streaming service uses prediction information. For example, the adaptive streaming service uses historical information to generate prediction information. By way of further example, historical information may provide a basis to predict where the user is heading (e.g., when mobile) during an adaptive streaming session, network coverage associated with a predicted destination, network performance (e.g., traffic statistics, connection information, etc.) associated with the predicted destination, etc.

According to an exemplary embodiment, the adaptive streaming service is provided via an adaptive streaming algorithm. According to an exemplary embodiment, the adaptive streaming algorithm uses the context information or context information and prediction information to provide the adaptive streaming service, as described herein. For example, the adaptive streaming algorithm makes determinations pertaining to the adaptive streaming service, such as selections for an initial buffer level and subsequent buffer levels, selections as to when to start refilling the buffer, selections for an initial codec and subsequent codecs, and/or other dynamic parameters pertaining to adaptive streaming. According to an exemplary embodiment, a media player includes the adaptive streaming algorithm. According to other exemplary embodiments, the adaptive streaming algorithm is a component separate from the media player.

As a result of the foregoing, the user device may improve the user's streaming experience as well as improve the performance of the user device. For example, the adaptive streaming service may decrease the time required to start streaming media playback, improve video quality adaptation, reduce the amount and/or number of buffer underruns, and decrease power consumption on the user device by enabling longer idle periods between buffer refills.

Figure 1:
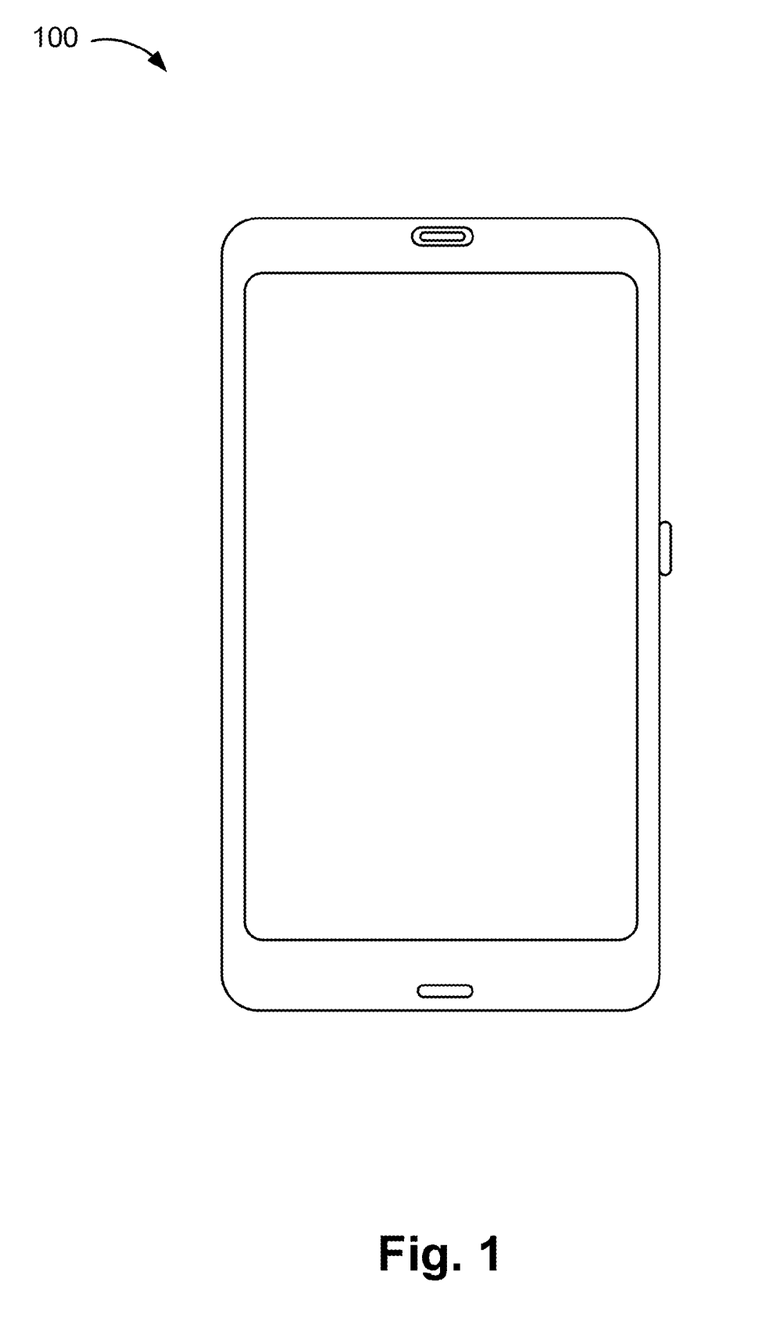
FIG. 1 is a diagram illustrating an exemplary user device in which an exemplary embodiment of a context-based, adaptive streaming service may be implemented.

According to an exemplary embodiment, a user device provides an adaptive streaming service, as described herein. FIG. 1 is a diagram of an exemplary user device 100 in which an exemplary embodiment of an adaptive streaming service may be implemented. User device 100 may be implemented as a mobile device. For example, the mobile device may take the form of a smartphone, a personal digital assistant (PDA), a tablet device, a palmtop device, a netbook, a gaming device, a music playing device, or other computational device that includes a display (e.g., a laptop, a wrist device, eyewear (e.g., glasses, headgear, etc.), a vehicular communication system, etc.) or is connectable to a display, which may be configured to provide the adaptive streaming service, as described herein. Alternatively, user device 100 may be implemented as a non-mobile device. For example, user device 100 may be implemented as a smart television, a set top box or another type of peripheral device to a television or a display device, a desktop computer, a gaming system (e.g., PlayStation 4, etc.) or other computational device that includes a display or is connectable to a display, which may be configured to provide the adaptive streaming service, as described herein. For purposes of description, user device 100 is illustrated as a mobile device in FIG. 1.

Figure 2:
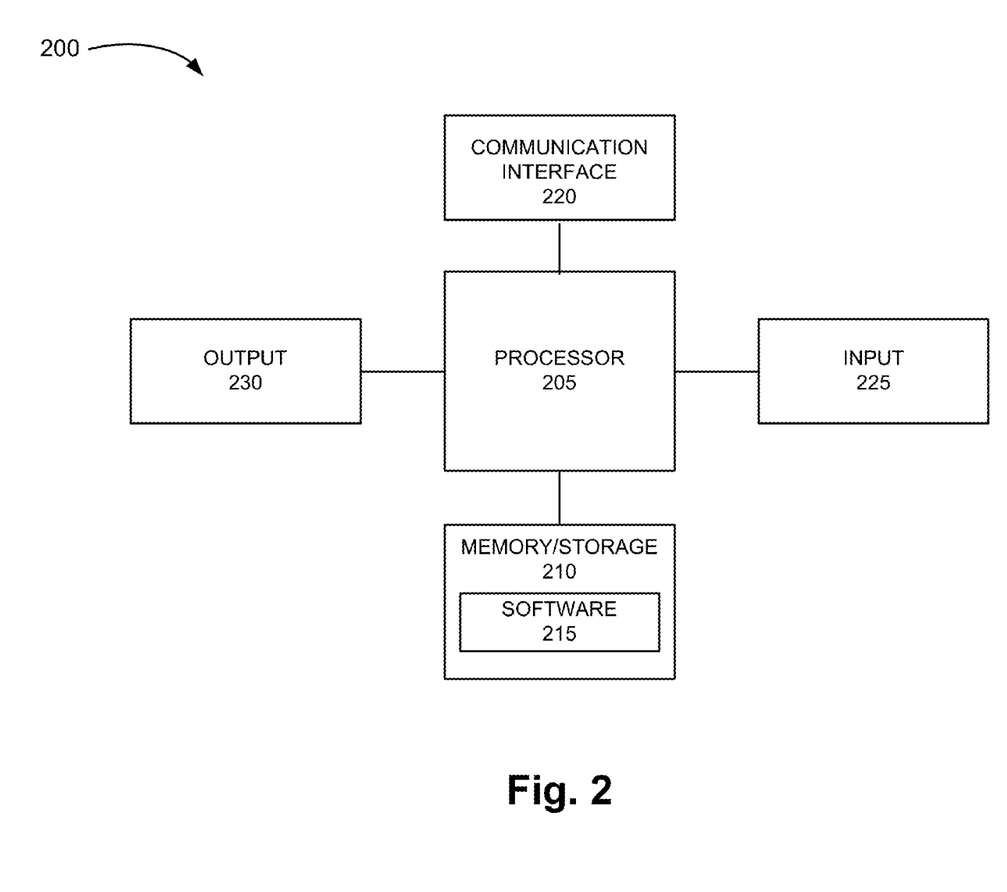
FIG. 2 is a diagram illustrating exemplary components of the user device.

FIG. 2 is a diagram illustrating exemplary components of user device 100 depicted in the previous figure and described herein. As illustrated, according to an exemplary embodiment, user device 100 includes a processor 205, memory/storage 210, software 215, a communication interface 220, an input 225, and an output 230. According to other embodiments, user device 100 may include fewer components, additional components, different components, and/or a different arrangement of components than those illustrated in FIG. 2 and described herein.

Processor 205 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, an ASIC, etc.), may include one or multiple memories (e.g., memory/storage 210), etc.

Processor 205 controls the overall operation or a portion of operation(s) performed by user device 100. Processor 205 performs one or multiple operations based on an operating system and/or various applications or programs (e.g., software 215). Processor 205 may access instructions from memory/storage 210, from other components of user device 100, and/or from a source external to user device 100 (e.g., a network, another device, etc.).

Memory/storage 210 includes one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from user device 100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, software, and/or instructions related to the operation of user device 100.

Software 215 may include an application or a program that provides a function and/or a process. Software 215 may include firmware. By way of example, software 215 may comprise a telephone application, a multi-media application, an e-mail application, a contacts application, a calendar application, an instant messaging application, a web browsing application, a location-based application (e.g., a Global Positioning System (GPS)-based application, etc.), a camera application, etc. Software 215 includes an operating system (OS). For example, depending on the implementation of user device 100, the operating system may correspond to iOS, Android, Windows Phone, or another type of operating system (e.g., proprietary, BlackBerry OS, etc.).

As described herein, the adaptive streaming service may be implemented, in part, using software 215. The adaptive streaming service may also rely on processor 205 for the execution of software 215. Additionally, or alternatively, the adaptive streaming service may include a dedicated processor/circuitry to execute software 215. Exemplary components of the adaptive streaming service are described further below.

Communication interface 220 permits user device 100 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 operates according to one or multiple protocols, a communication standard, and/or the like. Communication interface 220 may include a GPS receiver.

Input 225 permits an input into user device 100. For example, input 225 may include a keyboard, a mouse, a display, a touchscreen, a touchless screen, a button, a switch, an input port, speech recognition logic, and/or some other type of visual, auditory, tactile, etc., input component. Input 225 may includes a sensor and/or other logic that obtains context information, as described herein. Output 230 permits an output from user device 100. For example, output 230 may include a speaker, a display, a touchscreen, a touchless screen, a light, an output port, and/or some other type of visual, auditory, tactile, etc., output component.

User device 100 may perform a process and/or a function in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 causes processor 205 to perform the process or the function. Alternatively, user device 100 may perform a process or a function based on the operation of hardware (processor 205, etc.).

Figure 3:
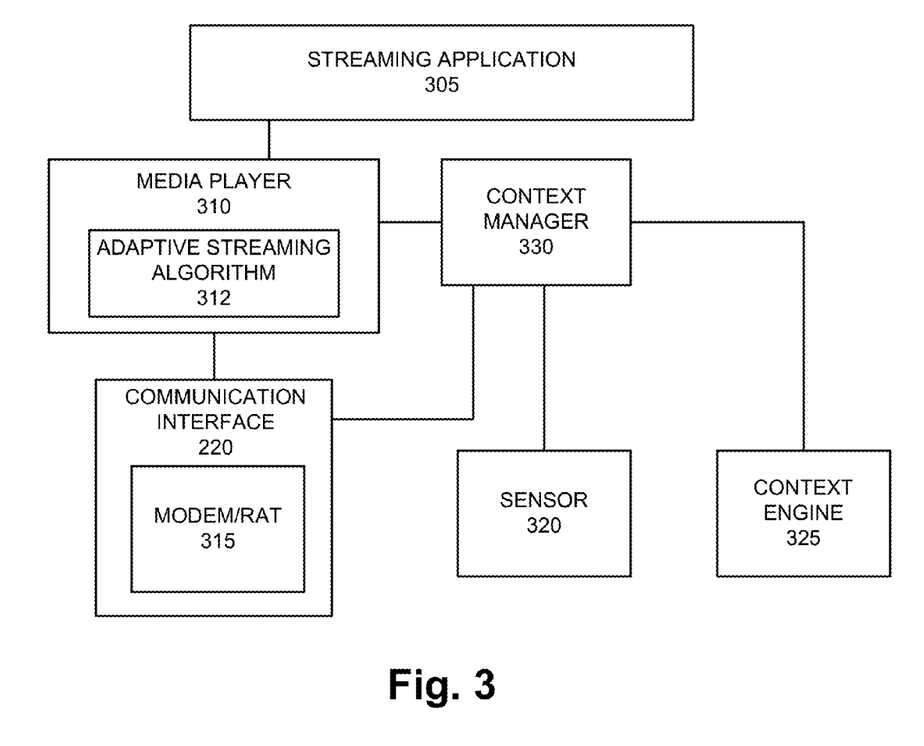
FIG. 3 is a diagram illustrating exemplary components of the context-based, adaptive streaming service.

As previously described, according to an exemplary embodiment, user device 100 includes an adaptive streaming service. A description of exemplary components that provide the adaptive streaming service is described further below. Referring to FIG. 3, according to an exemplary embodiment, user device 100 includes a streaming application 305, a media player 310 that includes an adaptive streaming algorithm 312, a modem/radio access technology (RAT) 315, a sensor 320, a context engine 325, and context manager 330.

Streaming application 305 includes a streaming engine. The streaming engine transmits requests to another device (e.g., a streaming server) and receives files streamed from the other device on behalf of media player 310. Streaming application 305 generates requests based on dynamic parameter values received from adaptive streaming algorithm 312. Streaming application 305 provides the received files of the streaming media (e.g., in a buffer) to media player 310 for playback.

Media player 310 is a component that allows the user to play streaming media. For example, media player 310 may play audio and video files (e.g., a movie, a television program, etc.) and audio files (e.g., music). Media player 310 may be implemented as a stand-alone or a plug-in. According to an exemplary embodiment, media player 310 includes an adaptive streaming algorithm 312.

Adaptive streaming algorithm 312 obtains context information or context information and prediction information from other components illustrated in FIG. 3. For example, context manager 330 provides context information or context information and prediction information to adaptive streaming algorithm 312. According to an exemplary embodiment, adaptive streaming algorithm 312 uses the context information or the context information and the prediction information to manage dynamic parameters pertaining to adaptive streaming.

As previously described, the dynamic parameters may pertain to buffer management, codec selection, and/or other aspects of adaptive streaming. According to an exemplary implementation, adaptive streaming algorithm 312 uses a weighted sum model or a weighted product model to calculate values for dynamic parameters. According to an exemplary implementation, a weight may be a static value. According to another exemplary implementation, a weight may be a dynamic value. For example, the value of the weight may be adjusted during the streaming session as historical information is collected and analyzed. This situation may occur, for example, when the user is mobile and/or the user is situated in a location in which no historical information is available.

According to an exemplary implementation, adaptive streaming algorithm 312 applies the weights to criteria stemming from the context information or the context information and the prediction information. According to an exemplary implementation, a value of the dynamic parameter may be a single value. For example, with regard to the selection of a codec, the value may indicate a particular bit-rate. According to another exemplary implementation, a value may be a range of values. For example, with regard to the selection of a codec, the value may indicate a range (e.g., from X bits/sec through Y bits/sec). Adaptive streaming algorithm 312 selects a "best-fit" in view of the available codecs falling in that range. For example, adaptive streaming algorithm 312 may select an upper bound codec falling within the range when the context information (e.g., bit-rate, received signal power, etc.) has remained in a steady state for a given period of time and/or a probability of predicted context information (e.g., prediction information) is high and that the predicted context information indicates a steady state and/or optimal conditions. Conversely, adaptive streaming algorithm 312 may select a lower bound codec falling within the range when the context information has not remained in a steady state for a given period of time and/or a probability of predicted context information is low and that the predicted context information does not indicate a steady state and/or sub-par conditions. Examples of adaptive streaming algorithm 312 using the context information or the context information and the prediction information for providing the adaptive streaming service are described further below.

Modem/RAT 315 includes a component that provides wireless communication services, such as modulation/demodulation, a protocol communication stack, etc, pertaining to communication interface 220. As a result of providing these wireless communication services, modem/RAT 315 may provide context information. For example, modem/RAT 315 may expose connection information, position information, and/or traffic information. The connection information, position information, and/or traffic information may be provided via the operating system (OS) of user device 100.

Sensor 320 is a component that collects context information. For example, sensor 320 may include a gyroscope, an accelerometer, a motion sensor, a compass, an altitude sensor, and/or other suitable sensor to obtain information. As a result of sensor 320, context information that includes motion information may be provided to context manager 330. The motion information may be provided via the operating system of user device 100.

Context engine 325 is a component that uses context information and historical information as a basis to generate prediction information. According to an exemplary embodiment, context engine 325 performs comparisons between current context information and historical information. Based on a comparison, context engine 325 generates prediction information. By way of example, the prediction information may pertain to a location to which the user is predicted to be traveling, network-related information (e.g., connection information, etc.) that results from the user's predicted traveling path to reach a predicted location, network-related information pertaining to the predicted location, and/or motion information (e.g., whether the user will remain stationary, mobile, or begin to move, stop at a location, etc.). The prediction information may be used to manage dynamic parameters pertaining to adaptive streaming.

Context engine 325 may also use information from other applications or services available, such as calendar information, weather information, etc., as a basis to generate prediction information, an example of which is described further below. Context manager 330 is a component that provides context information and prediction information to adaptive streaming algorithm 312.

Figure 4A:
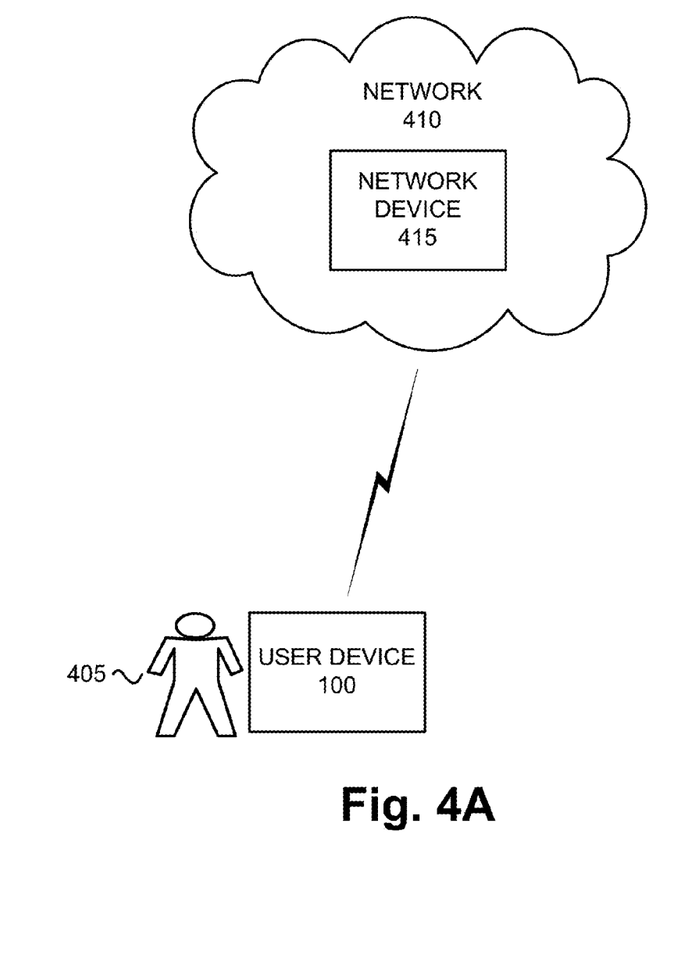
FIGS. 4A-4C are diagrams illustrating exemplary scenarios pertaining to an exemplary embodiment of the context-based, adaptive streaming service.
Figure 4B:
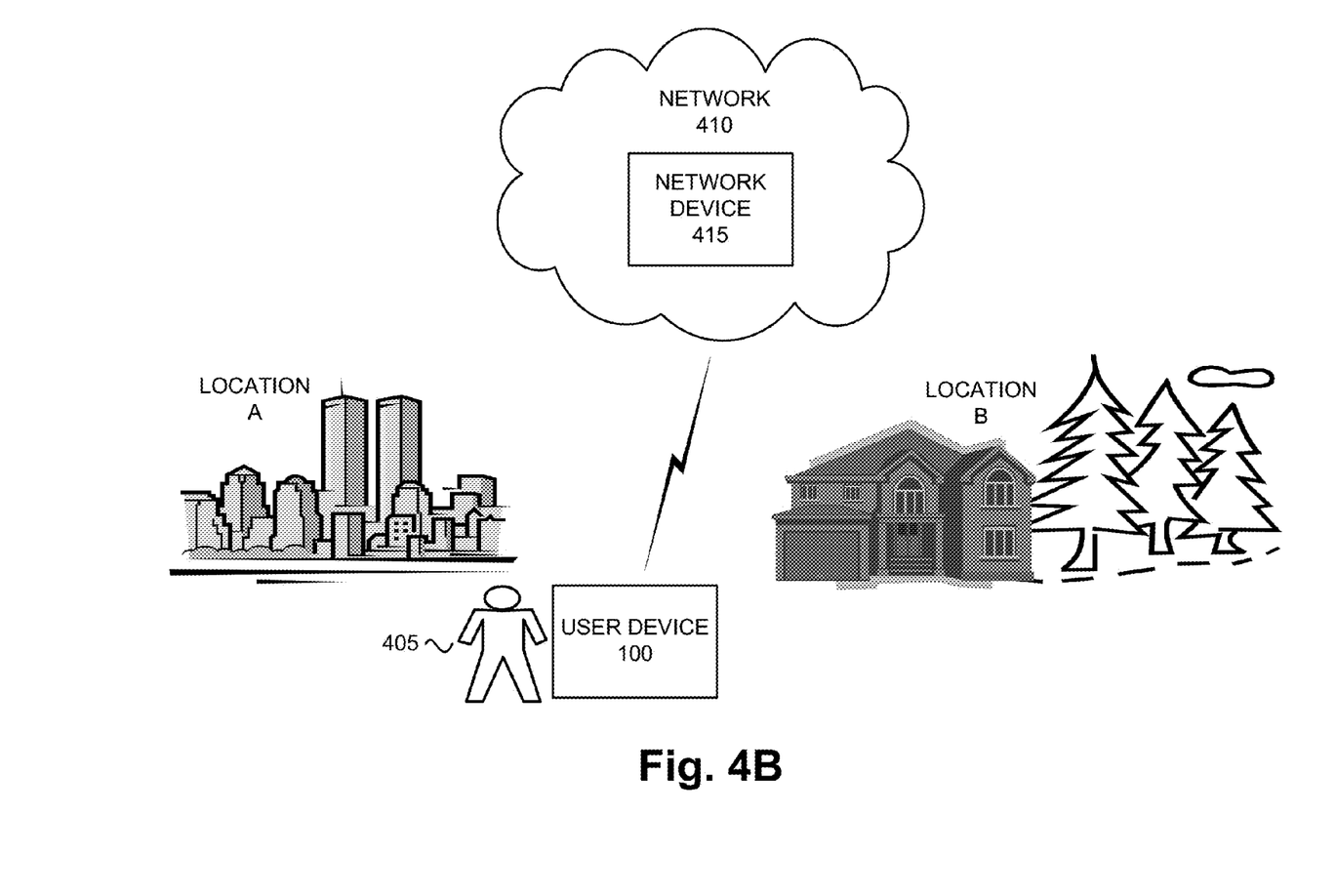
Figure 4C:
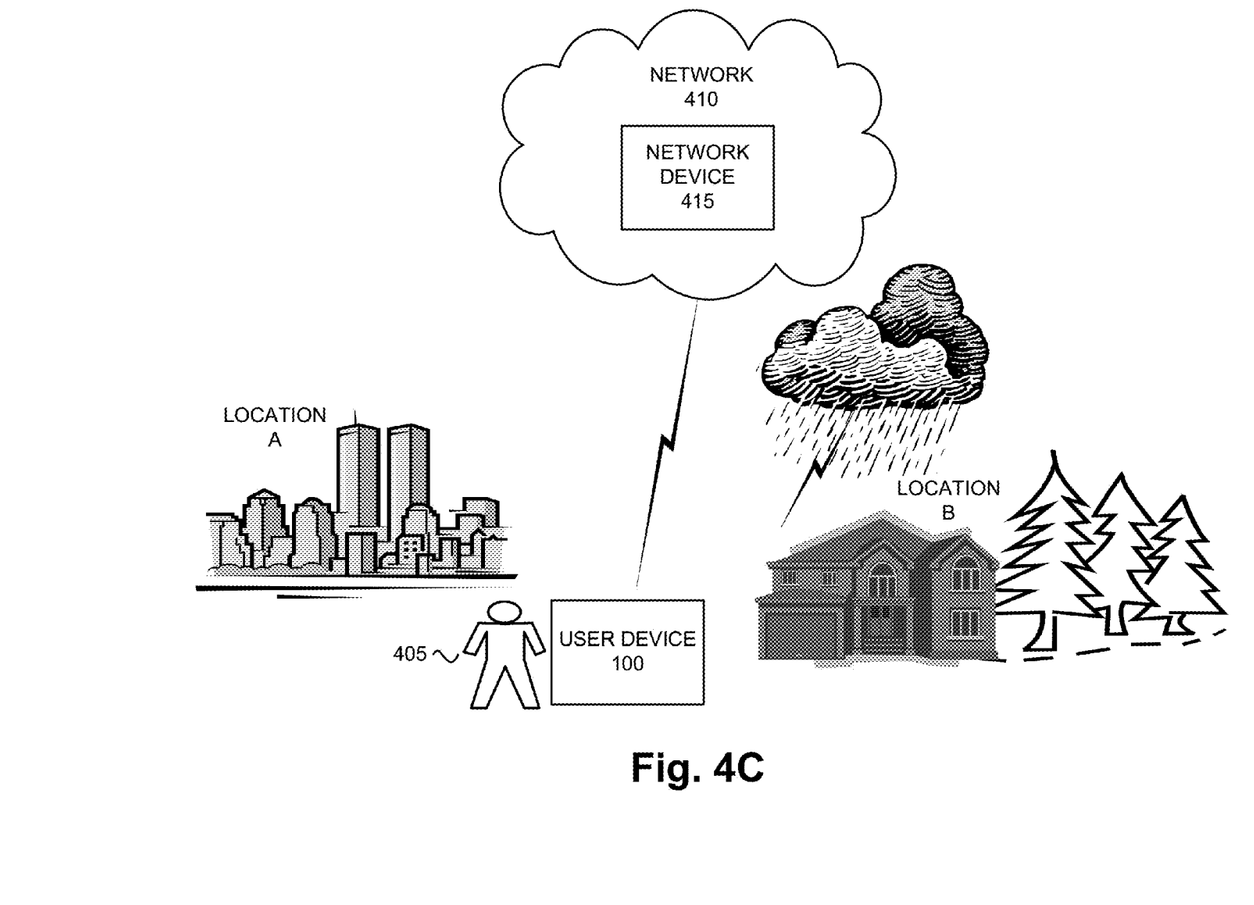

FIGS. 4A-4C are diagrams illustrating exemplary scenarios pertaining to an exemplary embodiment of the context-based adaptive streaming service. The scenarios described are illustrative on how context information and/or prediction information may be used to manage dynamic parameters pertaining to adaptive streaming.

Referring to FIG. 4A, according to an exemplary scenario, assume a user 405 operates user device 100. Also, assume that user device 100 is connected to network device 415 of a network 410. For example, network device 415 may correspond to an adaptive streaming server that delivers streaming media (e.g., audio and/or video) on-demand. Additionally, based on selecting a media, assume user 405 initiates a streaming session, via user device 100, while at home during the evening.

During the starting of the streaming session, adaptive streaming algorithm 312 receives context information or context information and prediction information. For example, adaptive streaming algorithm 312 receives connection information pertaining to the connection between user device 100 and network device 415, position information pertaining to user 405, motion information indicating that user 405 is stationary, and traffic information stemming from the connection between user device 100 and network device 415. Adaptive streaming algorithm 312 also receives, for example, prediction information. The prediction information may indicate that connection information, position information, and mobile information should remain relatively constant. For example, context engine 325 may use historical information stemming from previous sessions (e.g., previous streaming sessions, web-surfing sessions, etc.) to make such a prediction.

Adaptive streaming algorithm 312 analyzes the context information and the prediction information. For example, adaptive streaming algorithm 312 identifies values pertaining to the context information and the prediction information. Based on the context and prediction values, adaptive streaming algorithm 312 calculates a value of a dynamic parameter. By way of example, when the context information and the prediction information indicate a high throughput and prediction information indicates a high probability that user 405 will remain at home, adaptive streaming algorithm 312 may calculate dynamic parameter values that yield downloading many segments using a codec requiring a high data rate, and in turn, resulting in long idle periods. Conversely, according to other examples, if current connection information indicates low signal strength, prediction information indicates that connection information and traffic statistics will be poor, etc., adaptive streaming algorithm 312 may calculate dynamic parameter values that yield downloading few segments using a codec requiring a low data rate, and in turn, resulting in short idle periods. In either case, adaptive streaming algorithm 312 selects, among other parameters, based on the calculated dynamic parameter values, an initial codec level and an initial buffer level to begin the streaming session. Subsequently, adaptive streaming algorithm 312 may continuously receive context information and/or prediction information, and calculate values for dynamic parameters throughout the streaming session.

Referring to FIG. 4B, according to another exemplary scenario, assume user 405 operates user device 100 and is connected to network device 415 via network 410. According to this example, assume user 405 is traveling from location A (e.g., in the city where user 405 works) to location B (e.g., in the outer suburbs where user 405 resides) by a train. During this time, user 405 selects a movie to watch on user device 100. Based on historical data, context engine 325 provides prediction information to adaptive streaming algorithm 312. For example, the historical data indicates that user 405 has intermittently viewed movies when traveling from location A to location B during the hours of 6 p.m.-7:30 p.m., on days between Monday through Friday. Based on current position information, motion information, and date and time information, context engine 325 determines that user 405 is traveling home. While current connection information, as well as other information is being provided to adaptive streaming algorithm 312 during the trip, and adaptive streaming algorithm 312 is selecting values for dynamic parameters (e.g., buffer levels, codec selections, etc.), context engine 325 predicts, based on historical data, that an area approximately five miles from user's 405 home has poor network coverage. For example, data throughput, received signal strength, and packet loss indicate poor quality-of-service. In response to these predictions, adaptive streaming algorithm 312 increases the buffer level to its maximum as user 405 approaches the five mile area. As a result, the effects of lower quality of service (e.g., due to buffer underruns, poor signal strength, etc.) is minimized.

Referring to FIG. 4C, assume a similar scenario to that of FIG. 4B in which user 405 travels from work to home. However, in contrast to the scenario previously described, there is no five mile area of poor network coverage. Rather, the historical data indicates that network coverage is good and uniform for the trip home. However, as illustrated in FIG. 4C, assume that a rain storm with lightening is present in an area through which user 405 intends to travel. According to an exemplary implementation, when weather information is not available to adaptive streaming algorithm 312, connection information may indicate (e.g., due to the storm) severe swings in received signal strength, packet loss, etc., during the time that user 405 is traveling through the storm. Thus, although the historical data indicates different conditions, adaptive streaming algorithm 312 continuously adjusts dynamic parameter values (e.g., level of buffer, codec selection, when to request refill of the buffer, etc.) when providing the adaptive service. According to another implementation, when weather information is available ahead of time, adaptive streaming algorithm 312 may adjust dynamic parameter values before entering the storm, as well as during the time that user 405 is traveling through the storm. For example, a weather application may expose weather information based on prediction information from context engine 325. The weather application may be resident on user device 100 or a remote device (e.g., a web service, etc.). Depending on the OS of user device 100 and whether the weather application resides on user device 100 or a remote device, various methods (e.g., inter-application communication, binding a remote service to an application, etc.) may be implemented to allow, for example, context engine 330 to request weather information from the weather application. According to an exemplary implementation, context engine 325 interprets the weather information and outputs values pertaining to the weather information, such as location to which the weather pertains, date and time, a value pertaining to the weather (e.g., a rain storm, a storm with lightening and rain), a value pertaining to severity of the storm, etc., to adaptive streaming algorithm 312. According to another exemplary implementation, context engine 325 simply passes the weather information to adaptive streaming algorithm 312.

According to other scenarios, context engine 325 may use calendar information from a calendar application. For example, the calendar information may include date, time and place information, which can be used to generate prediction information and/or correlate with historical information.

Figure 5:
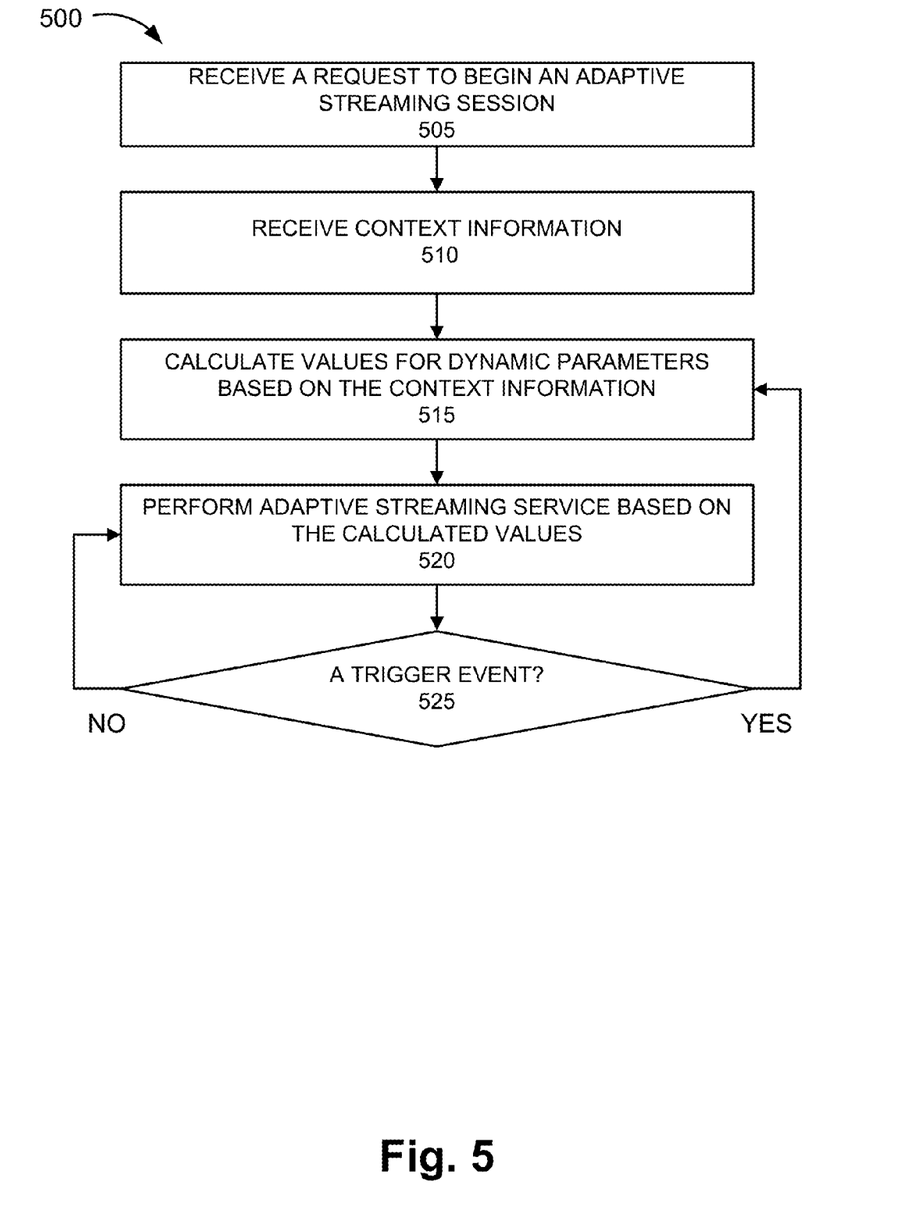
FIG. 5 is a flow diagram illustrating an exemplary process to provide a context-based, adaptive streaming service.

FIG. 5 is a flow diagram illustrating an exemplary process 500 to provide an adaptive streaming service based on context information. A step or an act described in process 500 may be performed by one or multiple components of user device 100. For example, processor 205 may execute software 215 to perform the step described.

Referring to FIG. 5, in block 505, a request to begin an adaptive streaming session is received. For example, streaming application 305 and/or media player 310 receive(s) a request to begin an adaptive streaming session.

In block 510, context information is received. For example, adaptive streaming algorithm 312 receives context information from context manager 330. Context information may include information from modem/RAT 315, sensor 320, and/or context engine 325. According to other examples, as previously described, adaptive streaming algorithm 312 may also receive prediction information. According to an exemplary embodiment, subsequent to block 510, adaptive streaming algorithm 312 receives context information and/or prediction information, continuously (e.g., a steady, real-time or near real-time stream). According to another exemplary embodiment, subsequent to block 510, adaptive streaming algorithm 312 receives context information and/or prediction information, intermittently, periodically, aperiodically (e.g., based on a triggering event).

In block 515, dynamic parameter values are calculated based on the context information. For example, adaptive streaming algorithm 312 analyzes the context information and calculates values for dynamic parameters based on an analysis of the context information. For example, as previously described, adaptive streaming algorithm 312 calculates values pertaining to codec selection and initial buffer level based on weighted model. According to other examples, adaptive streaming algorithm 312 may also select the values based on the prediction information.

In block 520, the adaptive streaming service is performed based on the calculated values. For example, streaming application 305/media player 310 downloads a particular number of segments of the selected media having a particular bit-rate based on the values calculated. Media player 310 begins to play the media on behalf of the user.

In block 525, it is determined whether a triggering event occurs. For example, a triggering event includes an event that would change a value for a dynamic parameter. For example, if connection information swings from high signal strength to low signal strength, such an event may be considered a triggering event. However, depending on the timing of such an event relative to the number of segments yet to be played from the buffer, etc., this event may or may not be considered a triggering event. According to a scenario in which a time to refill the buffer is drawing near, when this event occurs, then adaptive streaming algorithm 312 may consider this a triggering event. According to another scenario in which the event occurs immediately after the buffer has been filled, adaptive streaming algorithm 312 may not consider this a triggering event.

According to another example, a triggering event includes an event that may not necessarily change a value for a dynamic parameter, but requires an action to be performed so as to provide the adaptive service. For example, a time to refill the buffer may constitute a triggering event. In this regard, absent the termination of the session, this requires an action to be performed (e.g., to obtain additional segments of a particular bit-rate). However, the selected values for the dynamic parameters may or may not change.

If it is determined that the triggering event does not occur (block 525—NO), then process 500 continues to block 520. If it is determined that the triggering event does occur (block 525—YES), then process 500 continues to block 515.

Although FIG. 5 illustrates an exemplary process 500 to provide the adaptive streaming service, process 500 may include additional operations, fewer operations, and/or different operations than those illustrated in FIG. 5, and as described.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, a dedicated processor (not illustrated), etc.) or a combination of hardware and software (e.g., software 215). The embodiments have been described without reference to the specific software code since software can be designed to implement the embodiments based on the description herein and the accompanying drawings.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 210.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
receiving, by a user device, a request to begin an adaptive streaming session;
receiving, by the user device, in response to receiving the request, context information, wherein the context information pertains to a link state between the user device and a device to provide a streaming media;

calculating, by the user device, based on the context information, values for dynamic parameters pertaining to the adaptive streaming session, wherein the dynamic parameters pertain to buffer management of a buffer and codec selection; and providing, by the user device, the streaming media to a user of the user device based on the values for the dynamic parameters;

determining that a triggering event occurs, based on the context information, and determining, in response to the determination that the triggering event occurs, that the values for the dynamic parameters are to be changed, according to a time to refill the buffer.

2. The method of claim 1, wherein the context information includes at least one of received signal strength by the user device, a protocol used by the user device, a wireless standard used by the user device, or a signal-to-noise ratio.

3. The method of claim 1, wherein the context information includes at least one of position information pertaining to the user device, traffic information pertaining to traffic statistics of the adaptive streaming session, or motion information pertaining to the user device.

4. The method of claim 1, further comprising:
receiving, in response to receiving the request, prediction information, wherein the prediction information pertains to a predicted location towards which the user is traveling and network conditions associated with the predicted location, the prediction information is generated, in part, based on at least one of weather information or calendar information; and
calculating, in response to receiving the prediction information, the values for the dynamic parameters based on the prediction information.

5. The method of claim 1, further comprising:
storing historical information pertaining to previous adaptive streaming sessions, the historical information comprises information pertaining to the user's previous streaming activity using the user device; and using the historical information as a basis to generate prediction information that pertains to the adaptive streaming session.

6. The method of claim 1, further comprising:
applying values of the context information to a weighted model, and wherein the calculating comprises:
using the weighted model to calculate the values for the dynamic parameters, wherein one of the values indicates a buffer level and another one of the values indicates a bit-rate for segments of the streaming media to download.

7. A user device comprising:
a communication interface;
a memory, wherein the memory stores software;
a processor, wherein the processor executes the software to:
receive a request to begin an adaptive streaming session;
receive, in response to receiving the request, context information, wherein the context information pertains to a link state between the user device and a device to provide a streaming media;
calculate, based on the context information, values for dynamic parameters pertaining to the adaptive streaming session, wherein the dynamic parameters pertain to buffer management of a buffer and codec selection; and
provide, via the communication interface, the streaming media to a user of the user device based on the values for the dynamic parameters;
determine that a triggering event occurs, based on the context information, and determine, in response to the determination that the triggering event occurs, that the values for the dynamic parameters are to be changed, according to a time to refill the buffer.

8. The user device of claim 7, wherein the context information includes at least one of received signal strength by the user device, a protocol used by the user device, a wireless standard used by the user device, or a signal-to-noise ratio.

9. The user device of claim 7, wherein the context information includes at least one of position information pertaining to the user device, traffic information pertaining to traffic statistics of the adaptive streaming session, or motion information pertaining to the user device.

10. The user device of claim 7, wherein the processor further executes the software to:
receive, in response to receiving the request, prediction information, wherein the prediction information pertains to a predicted location towards which the user is traveling and network conditions associated with the predicted location, the prediction information is generated, in part, based on at least one of weather information or calendar information; and
calculate, in response to receiving the prediction information, the values for the dynamic parameters based on the prediction information.

11. The user device of claim 7, wherein the software includes a media player, and the media player includes an adaptive streaming algorithm that calculates the values for the dynamic parameters.

12. The user device of claim 7, wherein each of the values includes an upper bound value and a lower bound value, and wherein one of the values indicates a time to refill the buffer.

13. The user device of claim 7, wherein the processor further executes the software to:
apply values of the context information to a weighted model, and wherein, when calculating, the processor further executes the instructions to:
use the weighted model to calculate the values for the dynamic parameters, wherein one of the values indicates a buffer level and another one of the values indicates a bit-rate for segments of the streaming media to download.

14. The user device of claim 7, further comprising:
a display, and wherein the streaming media is a movie.

15. A non-transitory storage medium that stores instructions executable by a processor of a computational device, which when executed, cause the computational device to:
receive a request to begin an adaptive streaming session;
receive, in response to receiving the request, context information, wherein the context information pertains to a link state between the computational device and a device to provide a streaming media;
calculate, based on the context information, values for dynamic parameters pertaining to the adaptive streaming session, wherein the dynamic parameters pertain to buffer management of a buffer and codec selection; and
provide, based on the values for the dynamic parameters, the streaming media to a user of the computational device;
determine that a triggering event occurs, based on the context information, and determine, in response to a determination that the triggering event occurs, that the values for the dynamic parameters are to be changed, according to a time to refill the buffer.

16. The non-transitory storage medium of claim 15, wherein the context information includes at least one of received signal strength by the computational device, a protocol used by the computational device, a wireless standard used by the computational device, or a signal-to-noise ratio.

17. The non-transitory storage medium of claim 15, wherein the context information includes at least one of position information pertaining to the computational device, traffic information pertaining to traffic statistics of the adaptive streaming session, or motion information pertaining to the computational device.

18. The non-transitory storage medium of claim 15, wherein the instructions comprise instructions to:
store historical information pertaining to previous adaptive streaming sessions, the historical information comprises information pertaining to the user's previous streaming activity using the computational device;
use the historical information as a basis to generate prediction information that pertains to the adaptive streaming session; and wherein the instructions to calculate comprises instructions to:
calculate, based on the context information and the prediction information, the values for the dynamic parameters pertaining to the adaptive streaming session.

19. The non-transitory storage medium of claim 15, wherein the instructions comprise instructions to:
apply values of the context information to a weighted model, and wherein the instructions for calculating comprise instructions to:
use the weighted model to calculate the values for the dynamic parameters, wherein one of the values indicates a buffer level and another one of the values indicates a bit-rate for segments of the streaming media to download.

* * * * *